July 27, 1965  R. F. HOZAK  3,197,044
BULK MATERIALS HANDLING PLANT
Filed June 21, 1962  9 Sheets-Sheet 9
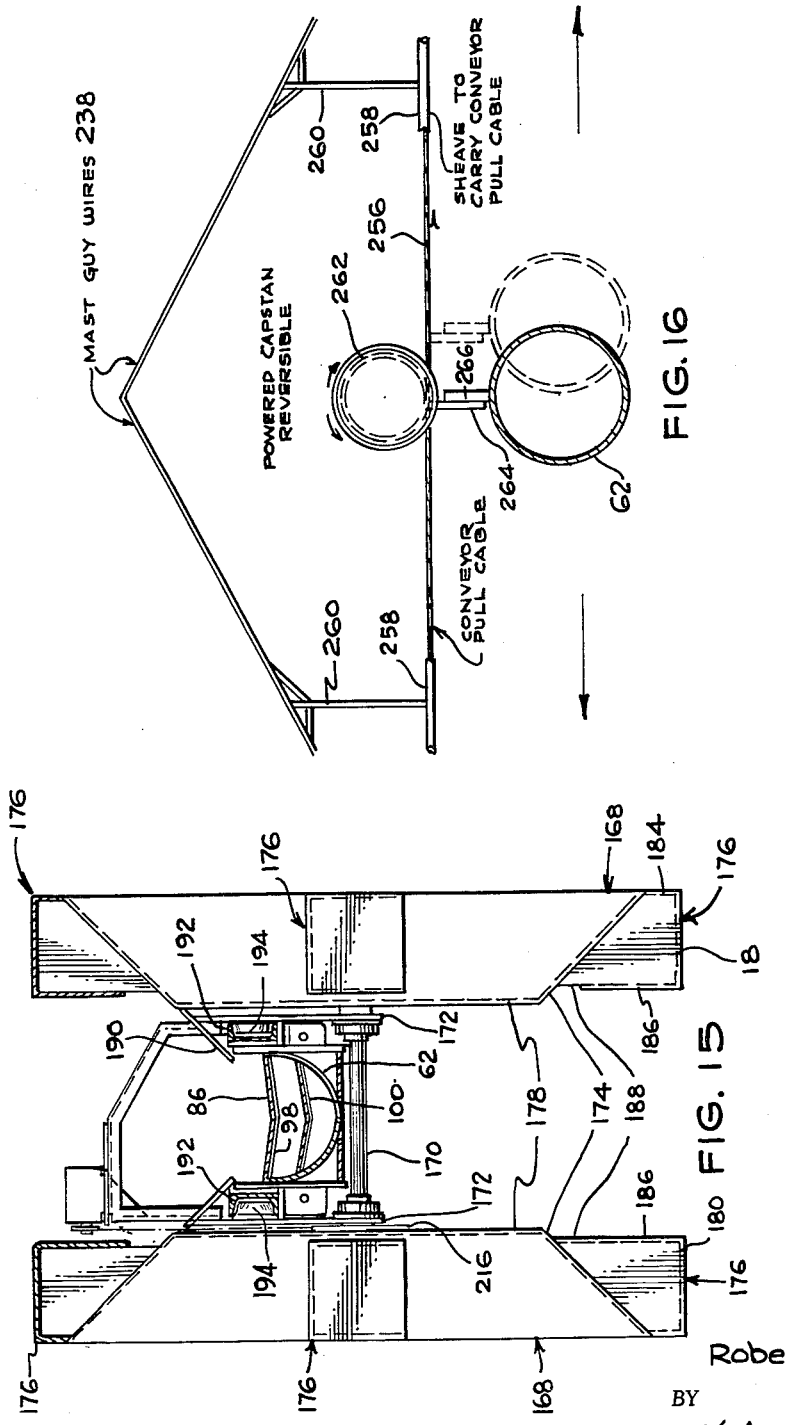
INVENTOR.
Robert F. Hozak
BY
Ooms, McDougall and Hersh
Attorneys United States Patent Office 3,197,044
Patented July 27, 1965

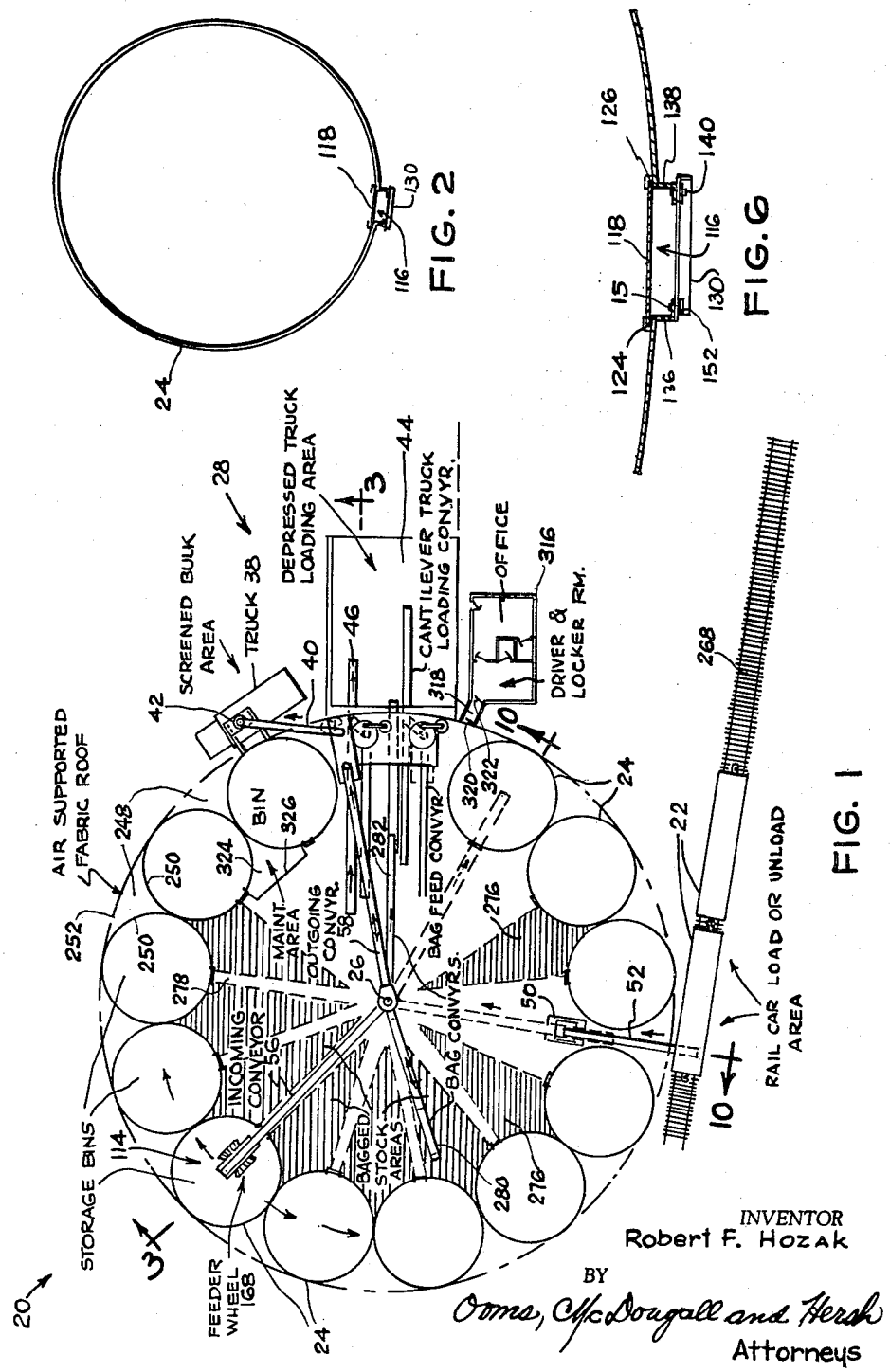

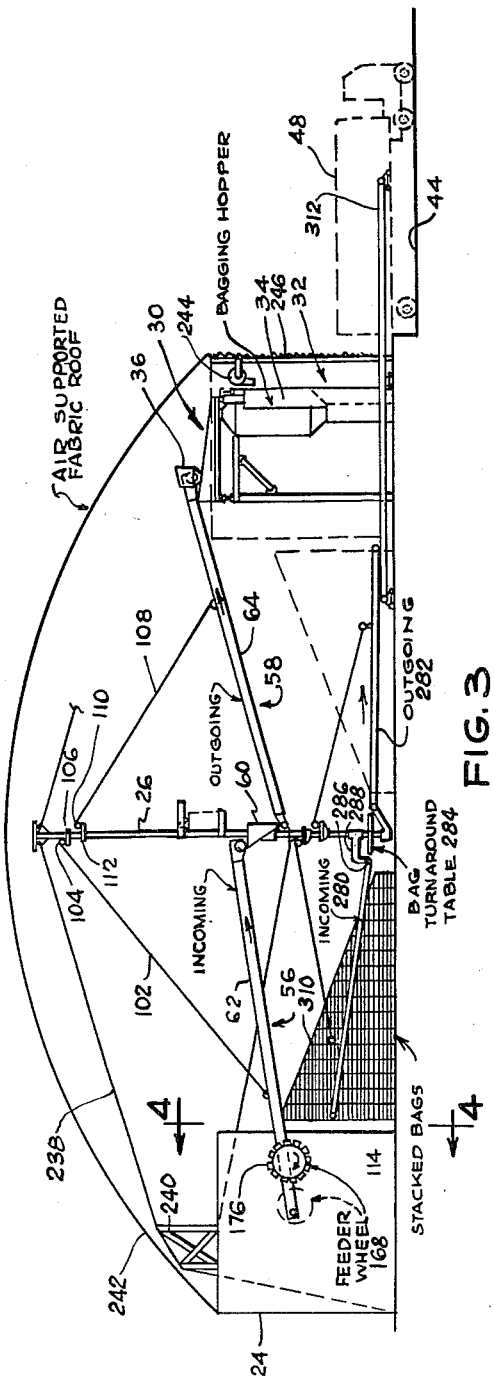
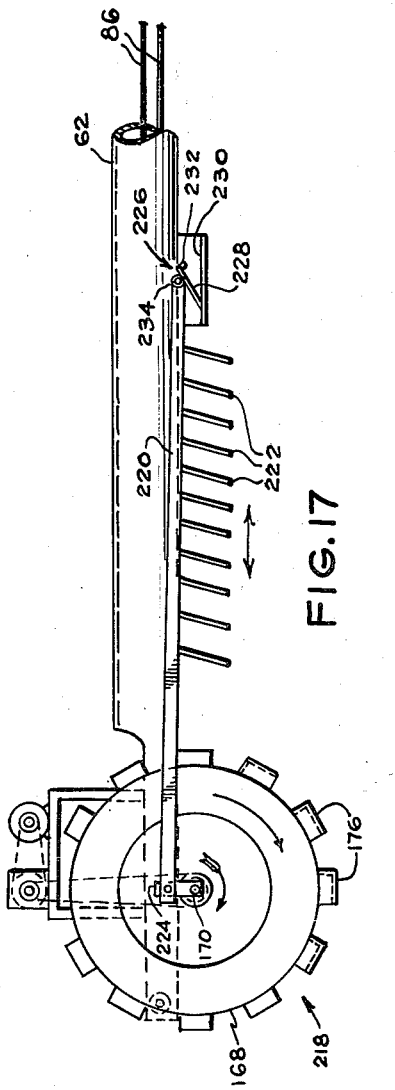

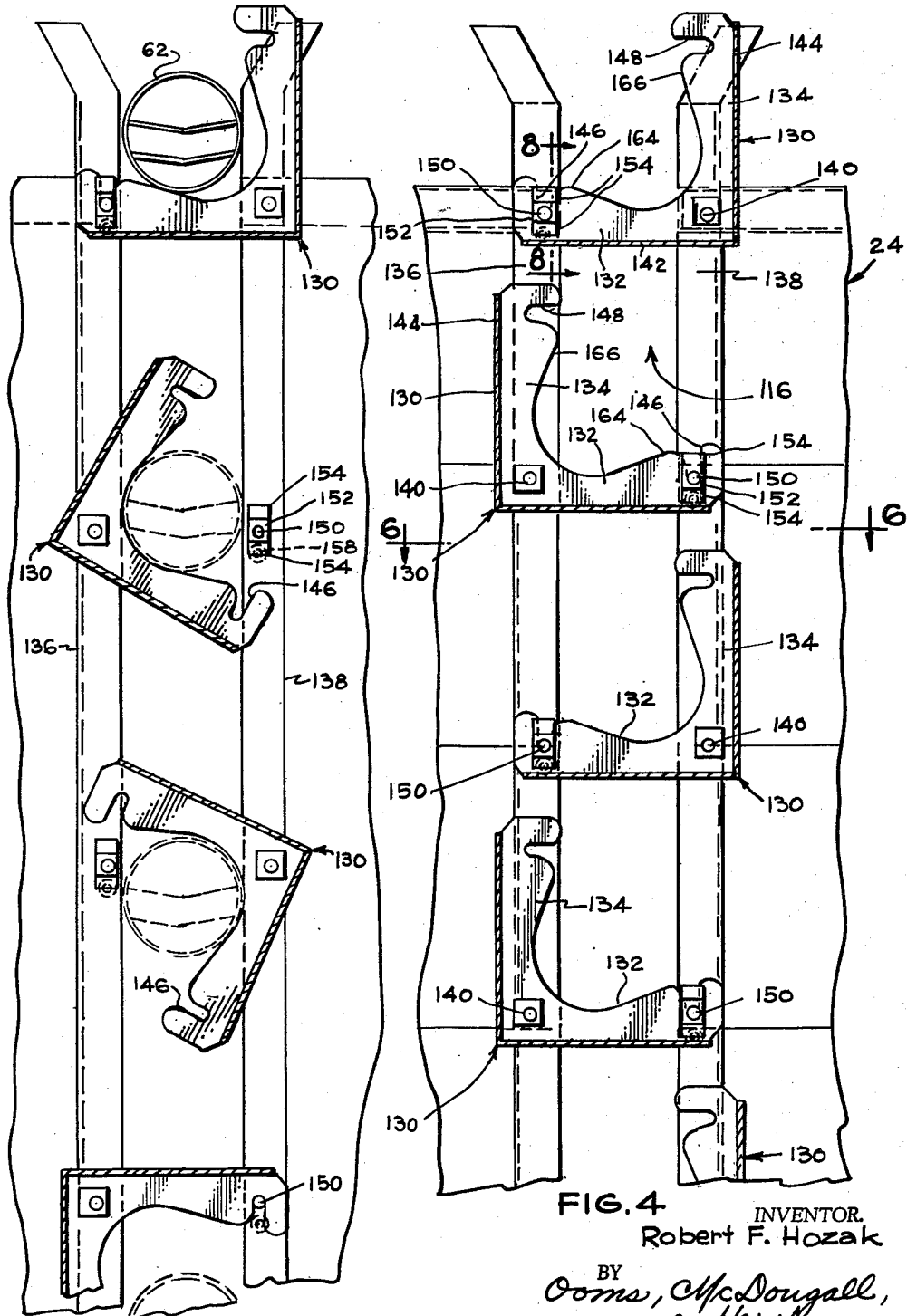

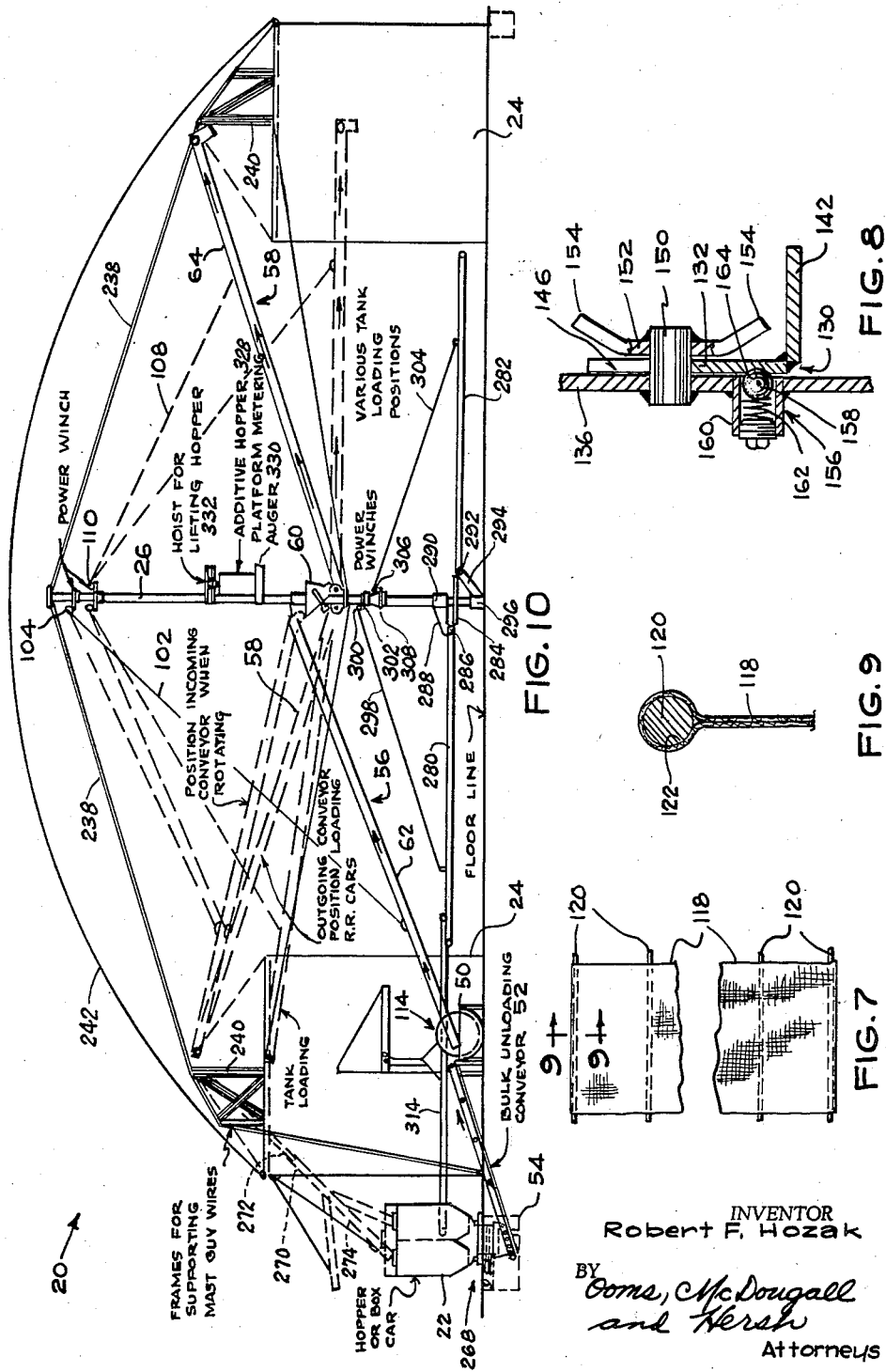

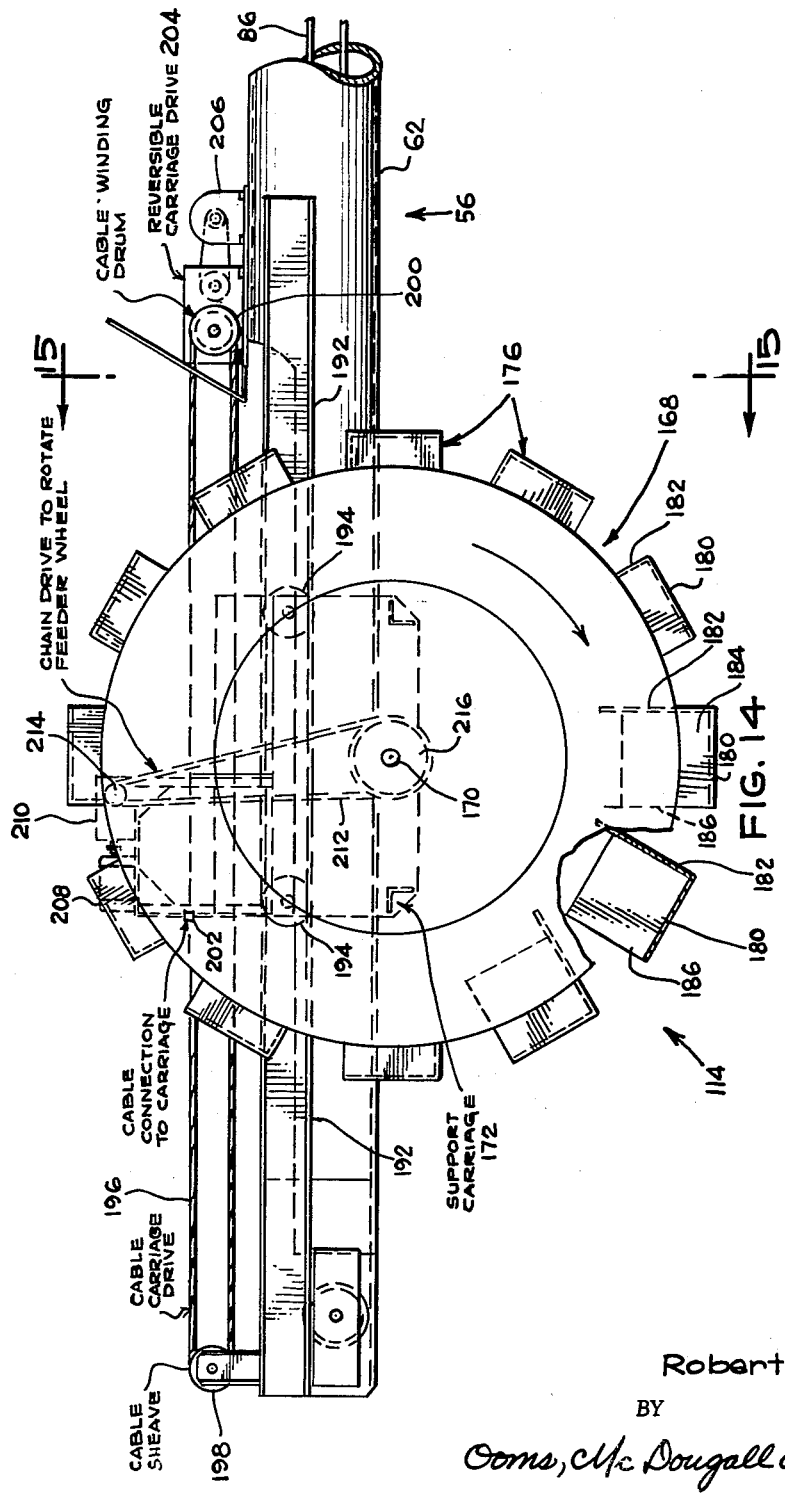

3,197,044
BULK MATERIALS HANDLING PLANT
Robert F. Hozak, Chicago, Ill., assignor to Dial-A-Bin Bulk Handling Corp., Chicago, Ill., a corporation of Illinois
Filed June 21, 1962, Ser. No. 204,293
10 Claims. (Cl. 214—16)

This invention relates to a new and improved bulk materials handling plant which may be employed for handling fertilizer or any other desired granular material, such as various chemicals, crushed rock salt, grain or the like.

One object of the present invention is to provide a new and improved plant which is very economical in construction yet is capable of handling a large volume of bulk materials on an extremely efficient and expeditious basis.

A further object is to provide a new and improved bulk materials handling plant having efficient facilities for receiving bulk materials arriving at the plant in barges, railroad cars or the like; a large number of bins or tanks for storing the bulk materials; facilities for screening and bagging the bulk materials; facilities for storing bags of the bulk materials; shipping facilities for handling outgoing materials in bags and in bulk, conveyors for carrying the bulk materials from the incoming facilities to the storage bins and from the storage bins to the screening, bagging and shipping facilities, and conveyors for carrying bags to and from the storage facilities.

Another object of the present invention is to provide a bulk materials handling plant in which the storage bins, the receiving facilities for incoming materials, the bagging facilities and the shipping facilities are grouped in a circle around a central mast which supports boom type conveyors adapted to be swung around the mast so that the materials in bulk and in bags may be routed to any of the facilities, as needed.

A further object is to provide a new and improved plant of the foregoing character which is equipped with a roof in the form of an air structure comprising a dome-shaped membrane which forms a clear span over the bins, the mast and other facilities, thus leaving the conveyors unobstructed so as to be freely movable around the mast.

Another object is to provide such a new and improved plant in which one of the conveyors is adapted to carry bulk materials to the mast end in which the outer end of the conveyor boom is provided with a feeder device which is movable downwardly into any of the storage bins for removing bulk materials therefrom.

It is a further object to provide a new and improved plant having a second conveyor for carrying the bulk materials away from the mast end for discharging the bulk materials into any of the storage bins or into the bagging or shipping facilities, together with means mounted on the mast for transferring the bulk materials between the incoming and outgoing conveyors.

Another object is to provide a new and improved plant having space between the central mast and the circle of bins for the storage of the materials in bags, together with a conveyor for carrying the bags to the mast, another conveyor for carrying the bags away from the mast, and means for transferring the bags between the two conveyors, so that the bags can be moved easily and expeditiously to and from the storage areas.

Further objects and advantages of the present invention will appear from the following description, taken with the accompanying drawings, in which:

FIG. 1 is a diagrammatic plan view of a bulk materials handling plant to be described as an illustrative embodiment of the present invention.

FIG. 2 is a plan view on a larger scale, showing one of the storage bins or tanks.

FIG. 3 is a diagrammatic elevational section taken generally along a line 3—3 in FIG. 1.

FIG. 4 is a fragmentary elevational section, taken generally along a line 4—4 in FIG. 3, and showing the entrance slot through which one of the boom conveyors is movable into each of the storage bins, and the automatic locking devices for withstanding the circumferential tension in the bin.

FIG. 5 is a diagrammatic view somewhat similar to FIG. 4 but showing various stages in the operation of the automatic locking devices.

FIG. 6 is a fragmentary horizontal section taken generally along a line 6—6 in FIG. 4.

FIG. 7 is an elevational view showing one of the curtains which may be employed for closing the entrance slots in the bins.

FIG. 8 is a fragmentary enlarged sectional view, taken generally along a line 8—8 in FIG. 4.

FIG. 9 is a fragmentary enlarged sectional view, taken generally along a line 9—9 in FIG. 7.

FIG. 10 is a diagrammatic elevational section taken through the plant, generally along a broken line 10—10 in FIG. 1.

FIG. 14 is an enlarged elevational view showing the feeder device, mounted on the outer end of the incoming conveyor, for removing bulk materials from the storage bins.

FIG. 15 is an elevational section taken generally along a line 15—15 in FIG. 14.

FIG. 16 is a somewhat diagrammatic elevational section taken generally along a line 16—16 in FIG. 12 and showing details of the mechanism for swinging the boom conveyors around the mast.

FIG. 17 is a diagrammatic elevational view, somewhat similar to FIG. 14 but showing a modified feeder device.

Figure 11:
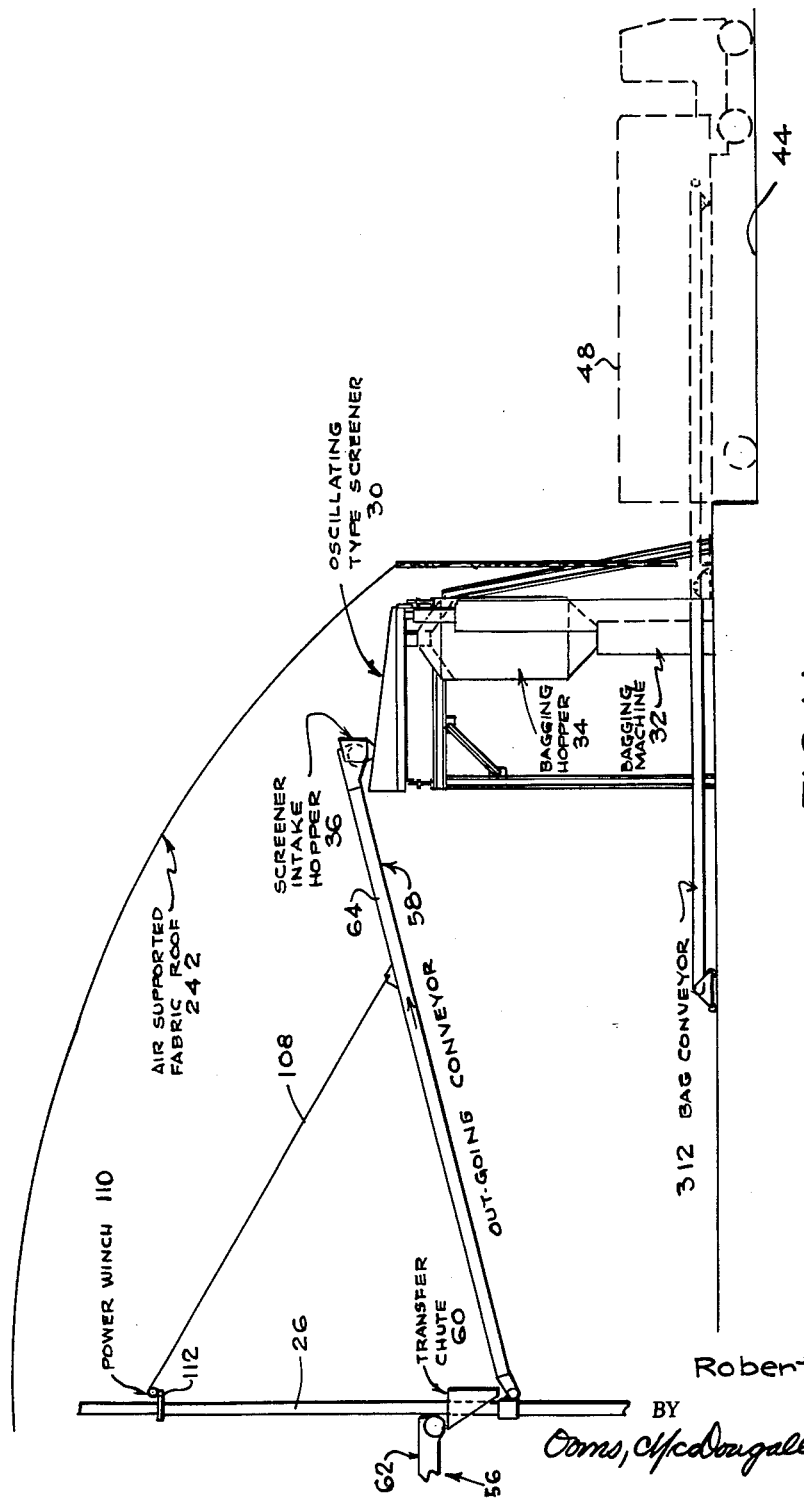
FIG. 11 is a fragmentary enlarged elevational section corresponding to the right-hand portion of FIG. 3.

As already indicated, the drawings illustrate a bulk materials handling plant 20 which may be employed as a distribution center for fertilizer or other granular bulk materials. The plant may be adapted to receive large shipments of bulk materials carried in railroad cars 22, barges or the like. In order to provide a large amount of storage capacity for handling the entire incoming shipment, the plant 22 is provided with a large number of tanks or bins 24 which in this case are cylindrical in shape. The bins 24 are preferably arranged in a substantially circular pattern around a central vertical mast 26.

The material handled by the plant 20 may be shipped out either in bulk or in bags or other suitable containers. Thus, the illustrated plant 20 comprises shipping facilities 28, including a screening machine 30 for segregating the materials according to the size of the granules, and a bagging machine 32 for bagging the screened material. It will be seen that the bagging machine 32 is equipped with a hopper 34 adapted to hold a quantity of the screened material, received from the screening machine 30. The material to be screened may be delivered to a hopper or other receptacle 36 at the top of the screening machine 30.

The screened bulk material may be delivered by the screening machine 30 to the hopper 34 of the bagging machine 32, or may be delivered in bulk to a truck 38 or other vehicle, through a pipe 40 extending between the screening machine 30 and a hopper 42 disposed outside the plant, over the parking area for the truck 38.

To provide for trucks to receive bags of the bulk material, a depressed truck ramp 44 is provided outside the plant, adjacent the bagging machine 32. A conveyor 46 may be provided to carry the bags directly from the bagging machine 32 to a truck 48 which may be backed downwardly onto the ramp. Alternatively, the truck 48 may be loaded with bags which have been stored in the plant 20, as will be developed in greater detail shortly.

It will be noted that the screening machine 30 and the bagging machine 32 are disposed adjacent the circle of the bins 24. In this case, a space is left between two of the bins to accommodate the screening and bagging machines 30 and 32.

The incoming material from the railroad cars 22, barges or the like may be delivered to an incoming receptacle 50 by means of a conveyor 52. In this case, the conveyor 52 is of the belt type and is adapted to extend to the receptacle 50 from a pit 54 into which the railroad cars 22 may be dumped. The cars 22 may be of the hopper bottom type so that the bulk material may be discharged directly into the pit 54. Other types of cars may be employed, in which case the material may be shoveled or otherwise transferred into the pit 54. The conveyor 52 or some other suitable conveyor may be employed to transfer the bulk materials from barges or the like to the receptacle 50. It will be noted that the incoming receptacle 50 is disposed adjacent the circle of the bins 24. A space is left between two of the bins 24 so that the conveyor 52 may pass between the bins.

In order to provide for expeditious and efficient handling of the bulk materials, the plant 20 is provided with an incoming conveyor 56 adapted to carry the bulk materials to the central mast 26, and an outgoing conveyor 58 for carrying the bulk materials away from the mast 26. A device 60 is provided for transferring the bulk materials between the incoming and outgoing conveyors 56 and 58. The incoming conveyor 56 may be employed to carry the bulk material from the incoming receptacle 50 to the mast 26. The bulk material may then be carried by the outgoing conveyor 58 to any of the storage bins 24 or to the receptacle 36 of the screening machine 30. Alternatively, the incoming conveyor 56 may be employed to remove the bulk material from any of the storage bins 24 and to carry the bulk material to the mast 26, where the bulk material is transferred to the outgoing conveyor 58 and is carried to the screening machine 30.

Figure 13:
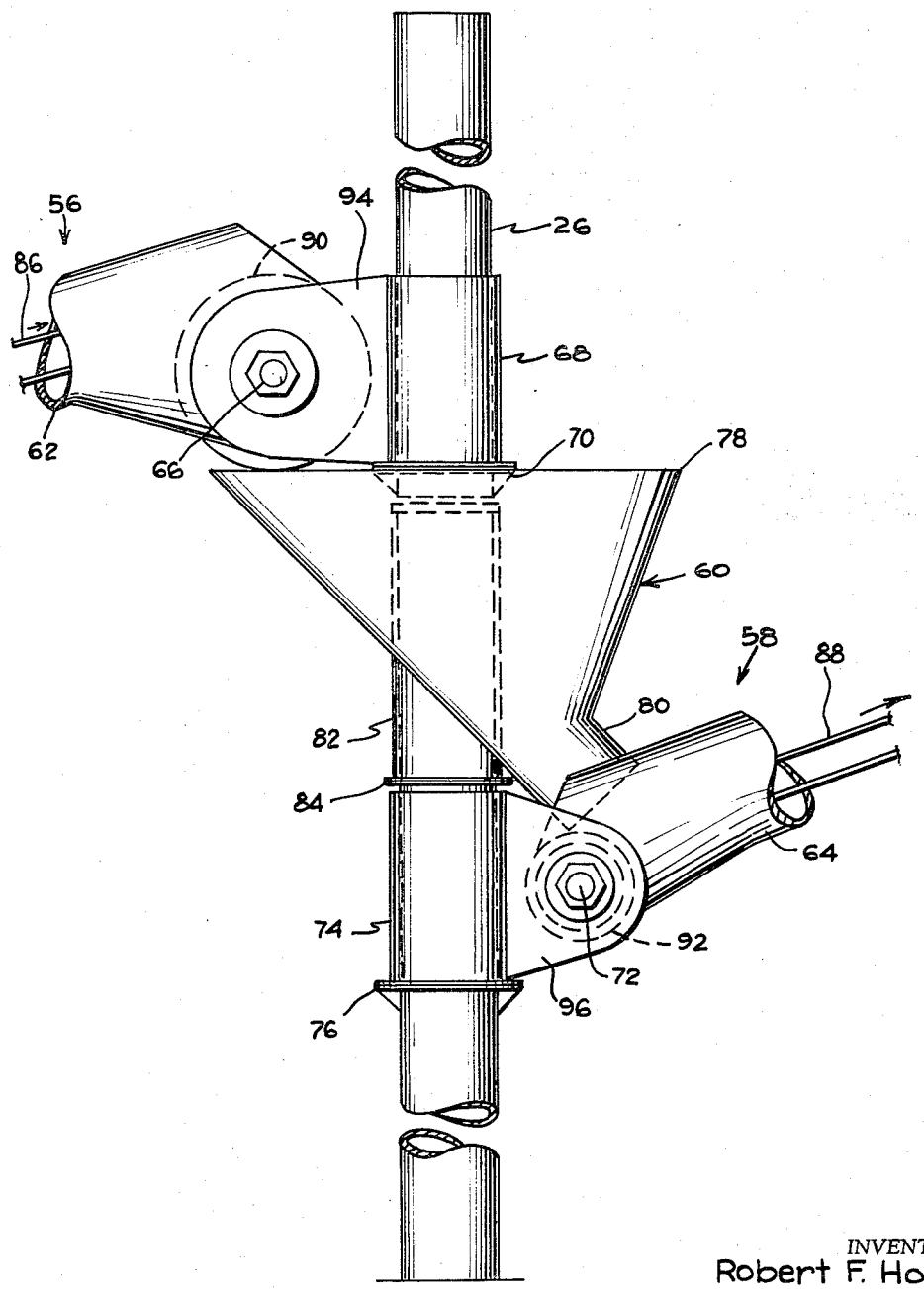
FIG. 13 is a fragmentary enlarged elevational view corresponding to the central portion of FIG. 3 and showing a device for transferring bulk materials between the incoming and outgoing conveyors at the mast.

The illustrated incoming and outgoing conveyors 56 comprise booms 62 and 64 which extend radially from the central mast 26. Each boom is swingable about the mast so as to be movable over any of the bins 24 or over any of the other facilities in the plant 20. In addition, each of the booms may be swung in a vertical plane. Thus, the boom 62 of the incoming conveyor 56 is connected at its inner end by means of a horizontal pivot 66 to a sleeve 68 which is received for swiveling movement about the mast 26, as shown to advantage in FIG. 13. The lower end of the swivel sleeve 68 is supported on a flange 70 secured to the mast 26.

Similarly, the inner end of the boom 64 of the outgoing conveyor 58 is connected by means of a horizontal pivot 72 to a swivel sleeve 74 which is rotatably received around the mast 26. The lower end of the sleeve 74 is supported by a flange 76 on the mast. The outgoing conveyor 58 is connected to the mast 26 at a lower point than the incoming conveyor 56.

The transfer device, for carrying bulk materials from the incoming conveyor 56 to the outgoing conveyor 58, takes the form of a hopper which is mounted on the mast 26 between the conveyors. The hopper 60 flares upwardly to a circular upper edge 78 which extends entirely around the mast 26 and is large enough to receive all of the material discharged by the incoming conveyor 56, no matter what the position of the conveyor 56 may be around the mast. At its lower end, the transfer hopper 60 is fitted with a spout 80 which slants downwardly and radially and is connected to the inner end of the outgoing conveyor 64 so that the hopper will act as a funnel to deliver the bulk materials to the conveyor 64. The hopper 60 is rotatably mounted on the mast 26 and is connected to the outgoing conveyor 64 so that it will rotate with the conveyor 64. Thus, the hopper 60 is provided with a swivel sleeve 82 which extends upwardly through the hopper and is rigidly secured thereto. The sleeve 82 is rotatably received around the mast 26 and is supported on a flange 84 secured to the mast. The spout 80 interlocks with the inner end of the conveyor boom 64 and causes the hopper or funnel 60 to rotate with the outgoing conveyor 58.

The illustrated conveyor booms 62 and 64 are in the form of hollow cylindrical tubes adapted to enclose apparatus whereby the bulk material will be carried along the booms. Thus, conveyor belts 86 and 88 may be provided within the incoming and outgoing conveyor booms 62 and 64 to carry the bulk materials. The belts 86 and 88 may be driven by means of electric motors 90 and 92 which may be mounted on brackets 94 and 96 secured to the swivel sleeves 68 and 74. Power may be supplied to the motors 90 and 92 by means of suitable flexible cables. Longitudinal plates 98 and 100 may be mounted within the booms 62 and 64 to support the conveyor belts.

The incoming and outgoing conveyors 56 and 58 may be swung upwardly and downwardly in order to bring the outer ends of the conveyor booms 62 and 64 to the desired elevation. Thus, the incoming conveyor 56 is provided with a hoisting cable 102 which is connected between the boom 62 and a power operated winch 104 mounted on a platform 106 adapted to swivel about the mast 26 near its upper end. By operating the winch 104, the cable 102 may be reeled in or payed out so as to raise and lower the conveyor boom 62. It will be understood that the winch 104 and the platform 106 are rotatable with the conveyor 56, by virtue of the connection afforded by the cable 102.

Similarly, a hoisting cable 108 is connected between the outgoing conveyor boom 64 and a power operated winch 110 which is mounted on a platform 112 adapted to swivel about the mast 26 just below the platform 106.

The incoming conveyor 56 is adapted to remove bulk materials from any of the storage bins 24. For this purpose, a feeder or digger 114 is provided on the outer end of the incoming conveyor boom 62. The feeder 114 and the outer portion of the boom 62 are movable downwardly into each of the bins 24 to a point adjacent the lower end of the bin, so that virtually the entire content of the bin may be removed mechanically, without resorting to manual feeding of the conveyor 56. Various mechanical feeders might be provided that could be moved into each bin 24 through the open top thereof. However, in this case, the conveyor boom 62 is also adapted to be moved into the bin 24, through a vertical slot 116 which is formed in a portion of the wall thereof, at a point facing radially inwardly toward the central mast 26. The conveyor boom 62 is movable downwardly through the slot 116. Various means, such as sectional door panels, may be employed to close the portions of the slot 116 below the boom 62 so as to prevent the bulk material from flowing out of the bin through the slot. In the illustrated construction, as shown to advantage in FIGS. 6–9, the slot 116 may be closed by means of curtains 118 extending across the slot on the inside of the bin 24. Each curtain 118 may be made of canvas or other heavy fabric or sheet material which may be reinforced with a plurality of horizontal metal rods 120. As shown to advantage in FIG. 9, the rods 120 may be retained in pockets 122 sewn into the canvas curtains 118.

The curtains 118 may be retained between vertical guides 124 and 126 mounted on opposite sides of the slot 116, so as to maintain the curtains in alignment with the slot. The weight of the bulk material in the bin 24 prevents the curtains 118 from sliding downwardly below the level of the bulk material. As the bulk material is removed by the conveyor 56, the boom 62 is allowed to move downwardly through the slot 116. The boom pushes the upper portion of each curtain 118 downwardly. As each curtain becomes completely uncovered by the depletion of the bulk material in the bin, the curtain panel may be removed from under the boom. Several of the curtain panels 118 may be employed to cover the entire slot 116 when the bin 24 is full.

As shown to advantage in FIG. 4, automatic locking devices 130 are provided to withstand the circumferential hoop tension in the wall of each bin or tank 24 due to the weight of the bulk material therein. The locking devices 130 transmit the tension across the slot 116 and prevent the bin 24 from spreading at this point. The illustrated locking devices 130 take the form of L-shaped levers, each of which has two latching arms 132 and 134 adapted to extend across the slot 116. The levers 130 are operated automatically by the conveyor boom 62 as it moves downwardly along the slot 116. As shown, the levers 130 are preferably mounted alternately on opposite sides of the slot 116. All of the levers 130 are essentially the same in construction, except that the levers on one side of the slot are right-handed, while the levers on the other side are left-handed.

To reinforce the tank or bin 24 along the slot 116, the locking levers 130 are mounted on rigid angle bars 136 and 138 which may be welded or otherwise secured to the bin 24 on opposite sides of the slot 116. Each of the levers 130 is swingable about a pivot pin 140 mounted on one of the bars 136 and 138. The locking arms 132 and 134 extend at right angles to each other from the axis represented by the pin 140. Reinforcing flanges or ribs 142 and 144 may be provided on the arms 132 and 134.

Adjacent its outer end, the locking arm 132 is formed with a latching slot 146 which opens laterally at right angles to the longitudinal axis of the arm 132. A similar latching slot 148 is formed in the arm 134. The slots 146 and 148 are adapted to interlock with a latching pin 150, mounted on one of the bars 136 and 138, directly across the slot 116 from the pivot pin 140. A guide plate 152 is mounted on the pin 150 and is spaced outwardly from the bar 136 or 138 on which the pin 150 is mounted. The arms 132 and 134 are adapted to slip between the guide plate 152 and the corresponding bar 136 or 138. To facilitate such movement of the arms 132 and 134, the guide plate 152 is formed with a pair of outwardly inclined ears 154 on its upper and lower ends.

Referring to the uppermost locking lever 130 in FIG. 4, it will be seen that the locking arm 132 extends horizontally across the slot 116, while the locking arm 134 extends upwardly from the pivot 140. The slot 146 in the arm 132 is interlocked with the pin 150. A detent mechanism 156 is provided to maintain the lever 130 in this position, despite the tendency of gravity to swing the lever 130 in a counterclockwise direction. As shown, the detent mechanism comprises a movable detent member in the form of a ball 158 which is movably mounted in a sleeve 160 and is biased outwardly by a spring 162. The sleeve 160 is mounted on the bar 136 just below the pin 150. The ball 158 is adapted to be received in a recess or opening 164 formed in the inner face of the arm 132, just below the lower end of the slot 146. When the uppermost lever 130 is moved into the position shown in FIG. 4, the detent ball 158 snaps into the recess 164. A similar detent arrangement is provided for each of the locking levers 130.

FIG. 5 illustrates the action of the locking levers 130 as the conveyor boom 62 moves downwardly through the slot 116. Referring again to the uppermost locking lever 130, the conveyor boom 62 engages the arm 132 and pushes it downwardly so that the lever 130 is swung in a counterclockwise direction. In this way, the slot 146 is disengaged from the pin 150. However, the counterclockwise swinging movement of the lever 130 moves the other locking arm 134 into a horizontal position so that the slot 148 becomes interlocked with the pin 150. It will be seen that a cam 166 is formed on the edge of the arm 132 for engagement by the conveyor boom 62 to insure that the lever 130 will be pushed a sufficient distance by the conveyor boom 62 to insure full locking engagement between the slot 148 and the pin 150. A similar cam 166 is formed on the locking arm 134.

When the conveyor boom 62 is hoisted upwardly through the slot 116, this sequence is reversed. Thus, the boom 62 engages the arm 134 and pushes it upwardly so as to swing the lever 130 in a clockwise direction. In this way, the slot 146 is again brought into locking engagement with the pin 150.

It has already been indicated that a feeder 114 is provided on the outer end of the incoming conveyor boom 62 to remove bulk material from the bins 24 and to feed the bulk material to the incoming conveyor 56. A preferred construction for the feeder 114 is shown in FIGS. 14 and 15. The illustrated feeder 114 comprises a pair of bucket wheels 168 secured to the opposite ends of a horizontal shaft 170 which is rotatably mounted on a frame 172 carried in the outer end of the incoming conveyor boom 62. The bucket wheels 168 are disposed on opposite sides of the boom 62. It will be seen that the upper side portion of the tubular boom 62 is cut away at its outer end to expose the belt 86. The bucket wheels 168 are adapted to dump the bulk material onto the conveyor 86.

In the illustrated construction, each of the bucket wheels 168 comprises a frustoconical member 174 which supports a plurality of buckets 176. The frustoconical member 174 tapers toward the conveyor boom 62. It will be seen that the inner or smaller end of the frustoconical member 174 is welded or otherwise secured to a circular disk 178 which extends at right angles to the shaft 170 and is secured thereto.

The buckets 176 are adapted to dig into the bulk material and to carry the bulk material upwardly until the buckets are inverted, whereupon the bulk material is dumped onto the conveyor belt 86. Thus, each bucket 176 has a lower or outer wall 180, adapted to dig into the bulk material. A rear wall 182 is connected between the lower wall 180 and the frustoconical member 174. The front of the bucket is left open to provide for the entry of the bulk material into the bucket. It will be seen that the bucket 176 also has side walls 184 and 186. The side wall 184 extends between the lower wall 180 and the larger end of the frustoconical member 174. The side wall 186 is connected to the lower wall 180 and extends toward the smaller end of the frustoconical member 174, leaving a gap 188 between the member 174 and the inner or upper end of the wall 186. When the bucket 176 is dumped, the bulk material slides down the frustoconical member 174 and through the gap 188, as will be evident from the upper portion of FIG. 15. An inclined guide plate 190 is mounted on the frame 172, closely adjacent the upper portion of the frustoconical member 174, to direct the bulk material from the member 174 onto the conveyor belt 86.

In order that the feeder 114 may be able to remove virtually all of the bulk material from each of the storage bins 24, the frame 172 is adapted to oscillate back and forth along the outer end portion of the conveyor boom 62. As already indicated, the bucket wheels 168 are supported on the frame 172 so that the bucket wheels oscillate with the frame. To provide for the oscillation of the frame 172, a pair of channel-shaped tracks 192 are secured to the outer end of the conveyor boom 62. Rollers 194 are mounted on the frame 172 and are adapted to travel along the tracks 192. The frame or carriage 172 may be oscillated by any suitable mechanism, which, for example, may advantageously utilize an endless cable 196 strung around a pulley 198 and a drum 200 mounted on the conveyor boom 62. A clamp 202 or other connection is employed to connect the carriage 172 to the upper flight of the cable 196. The cable 196 is oscillated back and forth by an automatically reversible drive 204 which is connected to the drum 200 and is operated by an electric motor 206. The drive 204 may be of any known or suitable type.

Another electric motor 208 is employed to rotate the bucket wheels 168. In this case, the motor 208 is connected to a speed-reducing gear mechanism 210 which in turn is connected to the shaft 172 by means of a belt 212 strung around pulleys 214 and 216. The pulley 214 is driven by the gear mechanism 210 while the pulley 216 is secured to the shaft 170.

FIG. 17 illustrates a modified feeder 218 which is similar to the feeder 168 in that it utilizes the same bucket wheels 168, rotatably mounted on the conveyor boom 62. However, the feeder 218 dispenses with the arrangement whereby the bucket wheels are oscillated along the conveyor boom 62. Instead, the bucket wheels 168 are rotatably mounted at a fixed point on the outer end of the conveyor boom 62. To feed the bulk material downwardly toward the bucket wheels 168, the feeder 218 employs a pair of elongated oscillating bars or rods 220 which are fitted with a plurality of downwardly projecting digger teeth or tines 222. The outer end of each bar 220 is pivotally connected to a crank 224 mounted on the shaft 170 which supports the bucket wheels 168. In this way, an oscillatory movement is imparted to each bar 220. A mechanism 226 may also be employed to impart upward and downward movement to the inner end of each bar 220. In this case, the mechanism 226 comprises a ramp 228 which is mounted above a horizontal guide 230. The ramp 228 is mounted on a pivot 232 so as to be swingable upwardly away from the guide 230. The inner end of the bar 220 is provided with a roller 234 which is adapted to ride up the ramp 228 and then to drop off the inner end of the ramp onto the horizontal guide 230. On the return motion of the bar 220, the roller 234 travels along the horizontal guide 230 and passes under the ramp 228, while lifting the ramp off the guide 230. When the roller 234 has passed under the ramp 228, the ramp returns downwardly into engagement with the horizontal guide 230 so that the roller will ride up the ramp on the next stroke of the bar 220. The movement of the bar 220 is such that the teeth 222 dig into the bulk material and scrape it downwardly to the bucket wheels 168.

The central mast 26 may be supported and held in a vertical position by means of a plurality of guy wires or cables 238 which are connected to the mast at its upper end. The guy wires 238 radiate outwardly and are inclined downwardly between the mast 26 and frames 240 which are mounted on top of the bins 24. The guy wires then extend downwardly between the bins and are anchored to the ground.

The entire bulk materials handling plant needs to be enclosed within a building so as to protect the plant equipment and the bulk and bagged materials from the weather. For the sake of economy, and to provide a clear and open span across the entire plant, so as to leave the bins 24 and the conveyors 56 and 58 unobstructed, it is preferred to provide the plant 20 with a roof in the form of an air structure 242. As shown, the air structure 242 takes the form of a dome-shaped membrane made of thin flexible fabric, plastic film or other sheet material. The membrane 242 forms a dome which arches above the guy wires 238 and the top of the mast 26. As shown, the outer edges of the dome-shaped membrane 242 are secured to the bins 24 which enclose the sides of the plant. A suitable fan or blower 244 is employed to maintain a slight positive air pressure within the plant. The air pressure effectively supports the dome-shaped membrane 242 so that there is no need to provide any internal structural supports for the membrane. If the internal air pressure is lost for any reason, the guy wires 238 provide temporary support for the membrane 242. However, the membrane 242 is normally kept inflated at all times. When it is inflated, the membrane 242 effectively withstands high winds, rain, snow and all other forces of the weather.

Adjacent the bagging machine 32, the side of the plant is closed by a wall section 246 as shown to advantage in FIGS. 3 and 11. Any other small openings between the bins 24 are closed by appropriate walls, panels, or curtains. Horizontal panels or curtains 248 of generally triangular shape are provided to close the openings between the generally circular lower edge of the dome-shaped membrane 242 and the circular upper edges of the storage bins 24. These horizontal panels or curtains 248 have a pair of curved edges 250 which are secured to the upper edges of the bins 24 and an outer edge 252 which is connected to the lower edge of the dome-shaped membrane 242.

Figure 12:
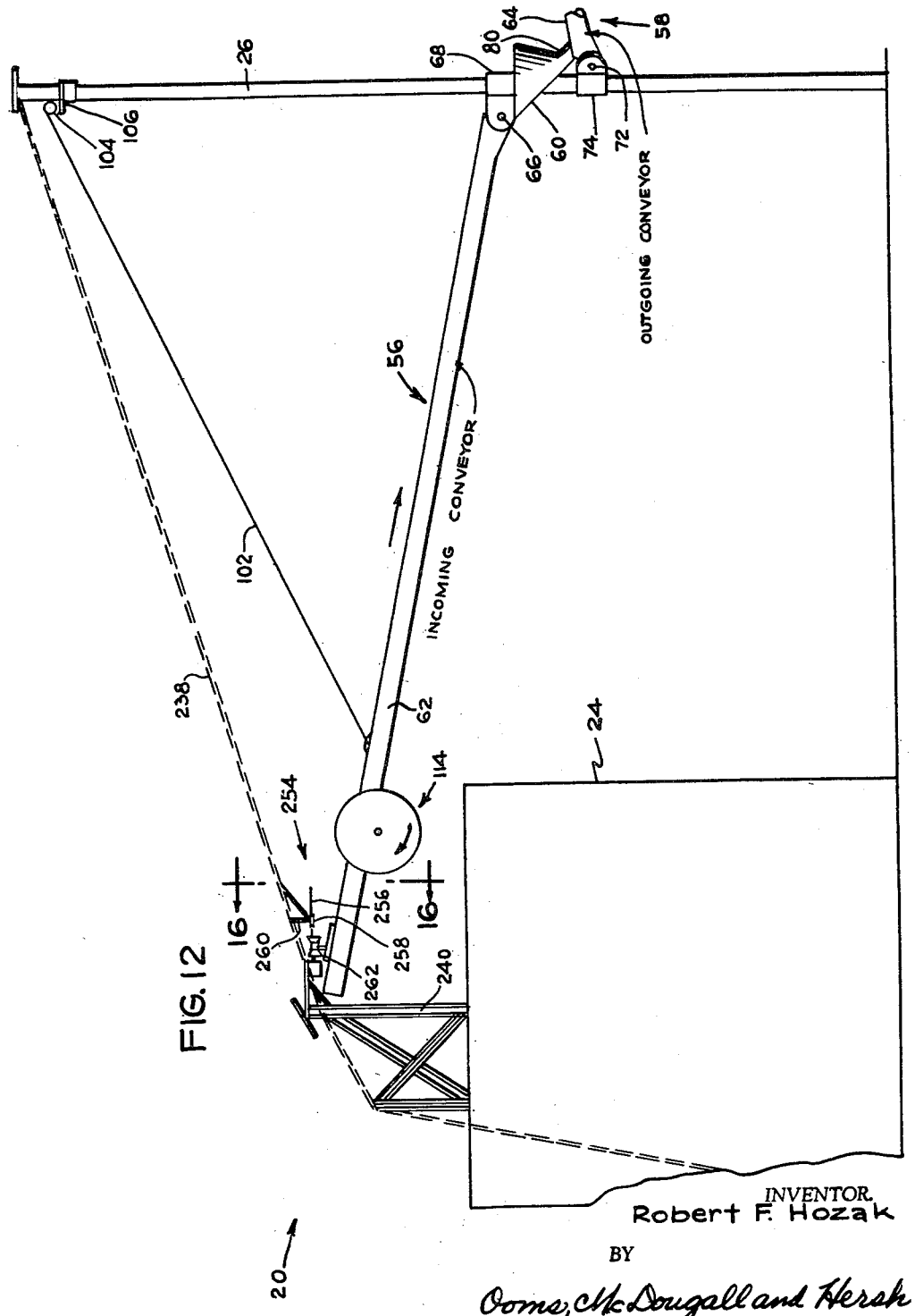
FIG. 12 is a fragmentary enlarged elevational section similar to the left-hand portion of FIG. 3 but showing the incoming conveyor raised to the position in which it may be swung around the mast.

As previously indicated, the incoming and outgoing conveyors 56 and 58 are swingable about the mast 26 to any desired position. There are no internal supports within the air structure 242 to interfere with the movement of the conveyors. FIGS. 12 and 16 illustrate a mechanism 254 for swinging the conveyors 56 and 58 around the mast 26. The mechanism 254 is illustrated in connection with the incoming conveyor 56, but it is also employed for moving the outgoing conveyor 58. The illustrated mechanism 254 comprises an endless circular cable 256 which extends entirely around the plant, above the tops of the bins 24. The cable 256 is strung around pulleys 258 which may be mounted on brackets 260 supported by the guy wires 238, adjacent the frames 240. A power operated winch 262 is mounted on one of the frames 240 to pull the cable around its generally circular path. As shown to advantage in FIG. 16, a plurality of downwardly projecting lugs 264 are secured to the cable 256 and are movable with the cable. The lugs 264 provide means whereby the conveyor booms 62 and 64 may be connected to the cable 256 for movement with the cable around the mast 26. An upwardly projecting lug or paddle 266 is secured to each of the conveyor booms 62 and 64 for engagement by the lugs 264 on the cable 256. When the conveyor boom 62 or 64 is to be swung about the mast 26, the boom is raised until the lug 266 on the boom is in the path of the lug 264 on the cable. The winch 262 is then actuated so as to move the cable 256. It will be understood that other means such as clamps may be employed to connect the conveyor booms 62 and 64 to the cable. An endless chain may be used instead of the cable, in which case hooks may be employed to connect the conveyor booms to the chain.

It has already been indicated that bulk materials may be received at the plant 20 from railroad cars 22. A railroad siding or track 268 is employed to bring the cars to the plant. It will be seen that the siding 268 extends alongside the plant. If desired, bulk materials may also be shipped out of the plant on railroad cars, such as the illustrated hopper bottom cars 22. The outgoing conveyor 58 may be employed in loading the cars with bulk material. For such service, the outgoing conveyor 58 is swung toward the siding 268 and is raised above the level of the bins 24 to the position shown in broken lines in the left-hand portion of FIG. 10. A chute 270, having an extensible section 272, may be employed to carry the bulk material from the outer end of the conveyor 58 to the railroad cars 22. At its lower end, the illustrated chute 270 has a vertically swingable section 274 adapted to direct the bulk material into the desired compartment of the underlying railroad car 22. The section 274 may be raised clear of the cars 22 so that they may be moved along the siding 268 without interference.

As shown to advantage in FIGS. 1 and 3, much of the space between the central mast 26 and the circle of bins 24 may be employed for storing material in bags. Thus, a plurality of bag storage areas 276 are indicated by shading in FIG. 1. Open aisles 278 are left between the central mast 26 and the storage bins 24 so that the incoming conveyor 56 may be lowered into each bin through the vertical slot 116 in the side wall thereof. Of course, the outgoing conveyor 58 may also be lowered into each of the storage bins 24, if desired. Thus, the bag storage areas 276 are generally sector-shaped.

To handle the bags of material, the plant 20 is preferably equipped with another set of conveyors, including an incoming bag conveyor 280 and an outgoing bag conveyor 282. The incoming conveyor 280 is adapted to carry bags toward the mast 26, where the bags are transferred to the outgoing conveyor 282 by a transfer device 284, which may take the form of a power operated turntable mounted on the mast. Each of the conveyors 280 and 282 is swingable vertically and is also swingable about the mast 26. In this way, each conveyor may be raised and lowered and may be swung so as to extend in any desired direction from the mast. Thus, the incoming conveyor 280 is swingable in a vertical plane about a pivot 286 which is supported on a bracket 288. The inner end of the bracket 288 is secured to a sleeve 290 which is rotatably mounted on the mast 26, above the turntable 284. Similarly, a pivot 292 is provided to connect the outgoing conveyor 282 to a bracket 294 which is secured to a sleeve 296, rotatably mounted on the mast 26, below the turntable 284. The incoming conveyor 280 is adapted to be raised and lowered by means of a hoisting cable 298 connected between the conveyor and a power operated winch 300 mounted on a platform 302 adapted to swivel about the mast 26. Similarly, a hoisting cable 304 is connected between the outgoing conveyor 282 and a power operated winch 306 mounted on a swivel platform 308.

The conveyors 280 and 282 may be of the open belt type and may be employed for carrying bags of fertilizer or other material to and from the bag storage areas 276. Thus, the incoming bag conveyor 280 may be employed to receive newly filled bags from the bag filling machine 32 and to carry the bags to the turntable 284, which transfers them to the conveyor 282. The bags are then carried outwardly by the conveyor 282 to the selected bag storage area. FIG. 3 illustrates the bags piled in a stack 310 in one of the bag storage areas 276 between the mast 26 and the bins 24. To provide clearance for swinging the conveyors 280 and 282 about the mast 26, the bags are stacked so that the top of the stack 310 slopes downwardly toward the mast.

It will be evident that the conveyors 280 and 282 may be employed to carry bags from the bag storage areas 276 when the bagged material is to be shipped out of the plant. The bags may be loaded onto trucks parked on the loading ramp 44. An extensible cantilever-type loading conveyor 312 is preferably employed to carry the bags into the trucks on the ramp 44, as shown to advantage in FIG. 3. The bags are fed to the loading conveyor 312 from the outgoing bag conveyor 282 on the mast 26.

Another extensible conveyor 314 is provided to carry bags to railroad cars on the siding 268. The conveyor 314 is preferably reversible so that it may also be employed to carry bags into the plant from railroad cars. Moreover, the conveyor 314 may also be employed to carry bulk materials to and from railroad cars on the siding 268.

If desired, a small office building 316 may be provided adjacent the truck ramp 44 of the plant and may be connected to the main plant building by an air lock 318 having separate doors 320 and 322 at the opposite ends thereof. The air lock 318 prevents any substantial loss of air from the main plant 20.

Various other facilities may be provided in the plant. Thus, a maintenance area 324 may be provided adjacent two of the bins 24. A wall or partition 326 may be erected between the maintenance area and the rest of the plant.

If desired, an additive dispensing hopper 328 may be mounted on the mast 26 above the transfer hopper 60 so that a small quantity of a desired additive material may be delivered to the hopper 60 so as to be mixed with the bulk material being handled by the hopper 60. Small quantities of desired metallic compounds may be added to fertilizer being handled by the conveyors 56 and 58 and the hopper 60, so as to enrich the fertilizer. The hopper 328 may be equipped with a metering mechanism 330 for dispensing a small but steady flow of additive material to the transfer hopper 60. A power operated hoist 332 may be employed to raise and lower the additive hopper 328.

It will be evident that the bulk materials handling plant of the present invention is extremely efficient and versatile and is capable of handling bulk materials at extremely low cost. The simple cylindrical bins provide low-cost storage for a large quantity of bulk materials. The system of conveyors radiating from the central mast makes it possible to load and unload the storage bins very quickly and economically. The provision of an air structure to enclose the plant makes it possible to provide an extremely long clear span across the plant without any internal structural supports to obstruct the swinging movement of the conveyors about the mast. This clear span is provided at extremely low cost. The bag conveyors, radiating from the mast make it easy to stack the bagged material in all of the available open spaces between the central mast and the various bins. The mechanical conveying equipment within the plant makes it possible to operate the plant with a minimum of manpower. Moreover, the plant is capable of handling a high volume of bulk material per hour. Accordingly, the cost of handling the bulk material is extremely low. Thus, the plant is extremely well adapted for handling fertilizer, rock salt and other bulk materials which require protection from the weather.

Various modifications, alternative constructions and equivalents may be employed without departing from the true spirit and scope of the invention, as exemplified in the foregoing description and defined in the following claims.

I claim:

1. In a materials handling system,
the combination comprising a generally vertical mast,
a first swivel member rotatably received on said mast for rotation therearound,
a first conveyor having means for carrying materials toward said mast,
means connecting said first conveyor to said first swivel member for swinging movement in a generally vertical plane,
a second swivel member mounted on said mast for rotation therearound and disposed below said first swivel member,
a second conveyor having means for carrying materials away from said mast,
means connecting said second conveyor to said second swivel member for swinging movement in a generally vertical plane,
an annular chute mounted on said mast between said first and second conveyors,
and means connecting said chute to said second conveyor for rotation around said mast therewith,
said chute having an additional swivel member mounted axially therein and rotatably received on said mast, said chute having an enlarged annular mouth at its upper end for receiving materials from said first conveyor, said chute having a spout at its lower end for delivering the materials to said second conveyor.

2. In a bulk materials handling plant, the combination comprising a plurality of storage bins having open tops and disposed generally in a circle, a substantially vertical mast disposed centrally within the circle of said bins, first and second booms extending radially from said mast, means mounting each of said booms on said mast for swinging movement in a horizontal direction around said mast and also for swinging movement in a generally vertical plane, said booms being movable over any of said bins, a rotary feeder wheel mounted on the outer end of said first boom and movable into the open top of any of said bins for removing materials therefrom, a first continuously moving conveyor extending along the length of said first boom for receiving materials from said feeder wheel and carrying the materials along said first boom to said mast, said second boom comprising a second continuously moving conveyor extending along the length of said second boom for carrying materials away from said mast, an annular chute for carrying materials between said first and second conveyors, said chute having an axial sleeve mounted therein and rotatably received around said mast, said chute having an enlarged annular mouth at the upper end thereof for receiving materials from said first conveyor, said chute having a spout at its lower end for delivering materials to said second conveyor, and means connecting said chute to said second boom for rotation therewith about said mast.

3. In a bulk materials handling plant, the combination comprising a substantially vertical mast, first and second booms extending radially from said mast, means connecting each of said booms to said mast for swinging movement in a horizontal direction about the axis of said mast and also for swinging movement in a vertical plane, a rotary feeder wheel mounted on the outer end of said first boom, a first continuously moving conveyor extending along the length of said first boom for receiving bulk materials from said wheel and carrying the bulk materials to said mast, a second continuously moving conveyor extending along the length of said second boom for carrying the bulk materials away from said mast, an annular chute for carrying materials between said first and second conveyors, said chute having an axial sleeve mounted therein and rotatably received around said mast, said chute having an enlarged annular mouth at the upper end thereof for receiving materials from said first conveyor, said chute having a spout at its lower end for delivering materials to said second conveyor, and means connecting said chute to said second boom for rotation therewith about said mast.

4. In a bulk materials handling plant, the combination comprising a plurality of storage bins disposed generally in a circle, a substantially vertical mast disposed centrally in said circle, a plurality of guys connected to said mast near the top thereof and radiating downwardly and outwardly and holding said mast in a vertical position, a plurality of conveyor booms radiating from said mast, means supporting said conveyor booms for swinging movement in a horizontal direction around said mast and also for swinging movement in a vertical plane, at least one of said booms being movable into each of said bins, a dome-shaped flexible membrane forming a roof over said bins, said mast, said guys, and said conveyors, and means for providing a positive air pressure inside said membrane for supporting said membrane above said mast, said guys, and said conveyors, said guys being effective to support said membrane if said air pressure is temporarily lost.

5. In a bulk materials handling plant, the combination comprising a plurality of storage bins having open tops and disposed generally in a circle, a substantially vertical mast disposed centrally within the circle of said bins, first and second booms extending radially from said mast, means mounting each of said booms on said mast for swinging movement in a horizontal direction around said mast and also for swinging movement in a generally vertical plane, said booms being movable over any of said bins, a rotary feeder wheel mounted on the outer end of said first boom and movable into the open top of any of said bins for removing materials therefrom, a first continuously moving conveyor extending along the length of said first boom for receiving materials from said feeder wheel and carrying the materials along said first boom to said mast, said second boom comprising a second continuously moving conveyor extending along the length of said second boom for carrying materials away from said mast, and means for transferring the materials between said first and second conveyors at said mast, each of said bins being formed with a continuous vertical slot in the wall portion of the bin facing toward the mast, said first boom being movable downwardly along said slot whereby said rotary feeder wheel is movable into the lower portion of each bin.

6. The combination of claim 5, in which said first boom is in the form of a hollow elongated tube, said first conveyor extending within said tube.

7. The combination of claim 5, in which said first and second booms are in the form of hollow elongated tubes, said first and second conveyors extending within the corresponding tubes.

8. In a bulk materials handling plant, the combination comprising a plurality of storage bins having open tops and disposed generally in a circle, a substantially vertical mast disposed centrally within the circle of said bins, a boom extending radially from said mast, means mounting said boom on said mast for swinging movement in a horizontal direction around said mast and also for swinging movement in a generally vertical plane, said boom being movable over any of said bins, a rotary feeder wheel mounted on the outer end of said boom and movable into the open top of any of said bins for removing materials therefrom, and a continuously moving conveyor extending along the length of said boom for receiving materials from said feeder wheel and carrying the materials along said boom to said mast, each of said bins being formed with a continuous vertical slot in the wall portion of the bin facing toward the mast, said boom being movable downwardly along said slot whereby said rotary feeder wheel is movable into the lower portion of each bin.

9. In a bulk materials handling plant, the combination comprising a plurality of storage bins having open tops and disposed generally in a circle, a boom extending radially from a point adjacent the center of said circle, means mounting said boom for swinging movement in a horizontal direction and also for swinging movement in a generally vertical plane, said boom being movable over any of said bins, a rotary feeder wheel mounted on the outer end of said boom and movable into the open top of any of said bins for removing materials therefrom, and a continuously moving conveyor extending along the length of said boom for receiving materials from said feeder wheel and carrying the materials along said boom, each of said bins being formed with a continuous vertical slot in the wall portion of the bin facing toward the center of the circle, said boom being movable downwardly along said slot whereby said rotary feeder wheel is movable into the lower portion of each bin.

10. In a bulk materials handling plant, the combination comprising a plurality of storage receptacles disposed generally in a circle, a substantially vertical mast disposed centrally in said circle, a plurality of guys connected to said mast near the top thereof and radiating downwardly and outwardly and holding said mast in a vertical position, a conveyor boom radiating from said mast to said receptacles, means supporting said conveyor boom for swinging movement in a horizontal direction around said mast and also for swinging movement in a vertical plane, said boom being movable into each of said receptacles, a dome-shaped flexible membrane forming a roof over said receptacles, said mast, said guys, and said conveyor boom, and means for providing a positive air pressure inside said membrane for supporting said membrane above said mast, said guys, and said conveyor boom, said guys being effective to support said membrane if said air pressure is temporarily lost.

References Cited by the Examiner

UNITED STATES PATENTS

| | | | |
|---|---|---|---|
| 1,090,012 | 3/14 | Bauerle | 198—88 |
| 1,216,603 | 2/17 | Phillips | 214—10 X |
| 1,542,380 | 6/25 | Foster | 214—16 |
| 1,656,501 | 1/28 | Rienks | 198—103 |
| 2,358,289 | 9/44 | Kendall et al. | 198—103 |
| 2,560,823 | 7/51 | Roscoe et al. | 198—304 X |
| 2,587,854 | 3/52 | Johnson | 214—16 |
| 2,757,463 | 4/56 | Kolbe | 198—9 X |
| 3,003,611 | 10/61 | Pelzer | 198—88 |
| 3,062,392 | 11/62 | Eppard | 214—14 |
| 3,069,027 | 12/62 | Dischinger | 214—10 |

FOREIGN PATENTS

| | | |
|---|---|---|
| 155,459 | 2/54 | Australia. |
| 398,351 | 3/09 | France. |
| 563,248 | 11/32 | Germany. |
| 769,914 | 3/57 | Great Britain. |

OTHER REFERENCES

Publication Sheet Metal Worker, July 1945, pages 41 and 42.

HUGO O. SCHULZ, *Primary Examiner.*

GERALD M. FORLENZA, *Examiner.*